United States Patent [19]

Tanaka et al.

[11] 4,019,010

[45] Apr. 19, 1977

[54] MICROWAVE OVEN WITH UNIFORM ELECTRIC FIELD DISTRIBUTION

[75] Inventors: Junzo Tanaka, Fujiidera; Haruo Matsushima; Yukio Abe, both of Yamatokoriyama, all of Japan

[73] Assignee: Matsushita Electric Industrial Co., Ltd., Osaka, Japan

[22] Filed: Mar. 27, 1975

[21] Appl. No.: 562,412

[30] Foreign Application Priority Data

Apr. 17, 1974 Japan .............................. 49-43607

[52] U.S. Cl. ........................................ 219/10.55 F
[51] Int. Cl.² ........................................... H05B 9/06
[58] Field of Search .............. 219/10.55 F, 10.55 B, 219/10.55 R

[56] References Cited

UNITED STATES PATENTS

| | | |
|---|---|---|
| 3,127,494 | 3/1964 | Kellough et al. ............ 219/10.55 F |
| 3,493,709 | 2/1970 | Lavdo et al. ................ 219/10.55 M |
| 3,531,950 | 10/1970 | Foerstner ................ 219/10.55 F X |
| 3,819,900 | 6/1974 | Ironfield ...................... 219/10.55 F |
| 3,829,649 | 8/1974 | Igarashi ........................ 219/10.55 B |

*Primary Examiner*—Arthur T. Grimley
*Attorney, Agent, or Firm*—Stevens, Davis, Miller & Mosher

[57] ABSTRACT

A microwave oven having an improved electric field distribution to allow uniform heating of an article to be heated is disclosed. High frequency exciting means is positioned at the center, both depthwise and lengthwise, of a heating chamber of substantially parallelepiped structure, and the shapes and construction of the reflecting plate, stirrer vane, mount for partition and heating cavity are improved to allow uniform electric field distribution and improvement in cooking performance.

6 Claims, 9 Drawing Figures

FIG. 6
FIG. 7
FIG. 8
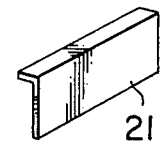
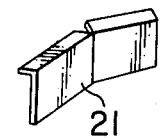
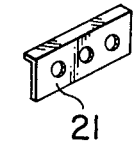
FIG. 9
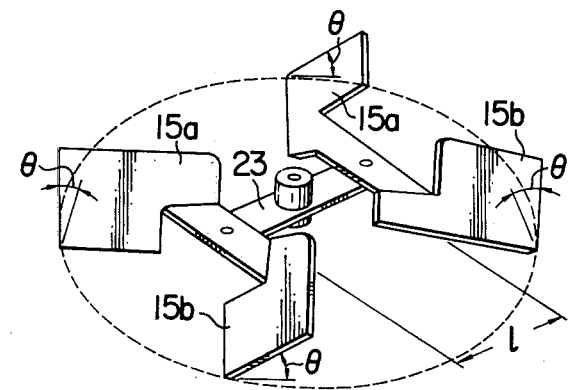

MICROWAVE OVEN WITH UNIFORM ELECTRIC FIELD DISTRIBUTION

The present invention relates to a microwave oven, and more particularly, to a microwave oven having improved performance to allow uniform heating of portions of food.

As a measure to improve the uniform heating characteristic of the microwave oven it has been proposed to establish an electric field distribution, which is symmetrical both depthwise and lengthwise, in a heating cavity. However there were many problems to be resolved before it could be put into practice. One of the problems was the weakening of the electric field at the center of the heating cavity even if a symmetrical electric field distribution could be established. This brings about the difficulty in that a center portion of a big food item such as a roast chicken is not fully heated. As a typical example, when a cake mix blended with water is poured into a big flat container and heated in a microwave oven, the surface portions thereof are well heated but the center portion thereof remains raw. Of course, the center portion may be heated well if heating is conducted for an extended period but in such a case the surface portions become too hard to keep their value as a food. The present invention contemplates enhancing the electric field at the center of the heating cavity to realize uniform heating as a whole.

It is a primary object of the present invention to prevent the degradation of the electric field distribution at the center of an oven, which is encountered when a high frequency exiting means is positioned at a symmetrical position, both depthwise and lengthwise, in an oven of any dimension.

It is another object of the present invention to allow for a large area of effective heating space in the heating cavity by mounting a microwave feeder section and a stirrer mount section on the same wall surface, as well as to improve the electric field distribution.

It is another object of the present invention to overcome the drawbacks encountered in the prior art. That is, a stirrer vane container and an article container are usually separated by a partition made of dielectric material, which is thin in order to reduce the dielectric loss and the cost. Thus, cleaning of the partition is difficult because it flexes and the stirrer vane may be deformed during cleaning.

It is another object of the present invention to construct a partition mount with dielectric material to prevent disturbance of the electric field distribution in the heating cavity. In the past, since the partition mount was constructed with a metal member, there was a drawback in that the partition mount caused disturbance of the electric field even if a symmetrical electric field distribution, both depthwise and lengthwise, could be established in the heating cavity.

It is another object of the present invention to allow uniform heating by causing an article to be positioned at the center of the heating cavity when a tray on which the article is mounted is inserted in the heating cavity.

Those and other objects, features and advantages of the present invention will become more apparent from the following detailed description of the preferred embodiment of the present invention when taken in conjunction with the accompanying drawings, in which:

FIGS. 6 through 8 show perspective views of the embodiments of flat plates constructed with conductors for changing the electric field mode in the heating cavity.

FIG. 9 shows a perspective view of a stirrer vane of the present microwave oven.

Figure 1:
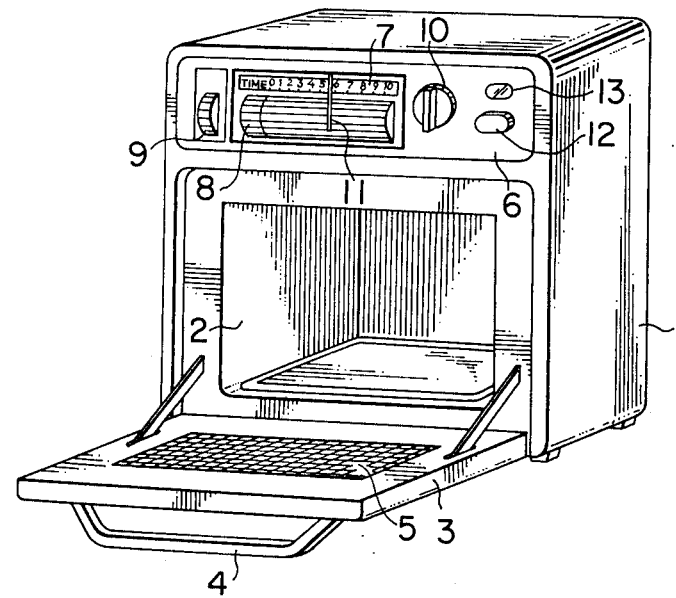
FIG. 1 shows a perspective view of a microwave oven, with a door thereof opened, in an embodiment in accordance with the present invention.
Figure 2:
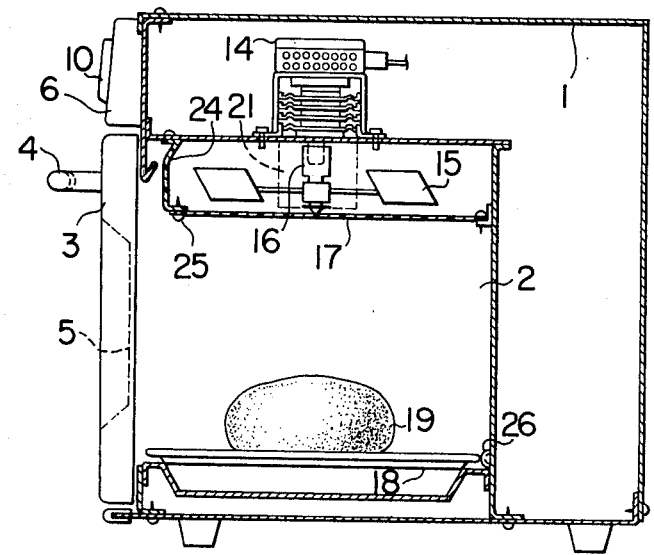
FIG. 2 shows a longitudinal sectional view of the microwave oven of FIG. 1.

The microwave oven is designed to heat and cook food using high frequency energy such as in the order of 2450 $MH_z$, and as shown in FIGS. 1 and 2 is provided with a heating cavity 2 within a main body 1 and a door 3 mounted to the main body 1 for releasably closing a front opening of the heating cavity. The door 3 is provided with a door handle 4 for operating the door and a viewing window 5 for allowing the inside of the heating cavity 2 to be viewed. A control panel 6 includes a scale 8 located corresponding to a time scale 7 of a cooking time setting timer, which scale 8 enables the setting of a heating time optimum to the type and quantity of food chosen. By rotating a control knob 9 the food to be cooked is set and the timer knob 10 is rotated to set a timer needle 11 to the amount of food chosen. In this manner an optimum cooking condition may be set. The reference numeral 12 designates a cooking button and 13 designates a cooking lamp which is lit when the high frequency wave is being radiated.

At the top of the heating cavity, there are provided a magnetron 14 for radiating high frequency energy into the heating cavity, a stirrer vane 15 rotatably driven by the air stream used to cool the magnetron for stirring the high frequency wave within the heating cavity, a stirrer shaft 16 for supporting the stirrer vane, a partition 17 for isolating the stirrer vane from the heating space, and a tray 18 on which article 19 to be cooked is mounted.

The present invention will be explained in conjunction with the microwave oven of the above construction.

Figure 3:
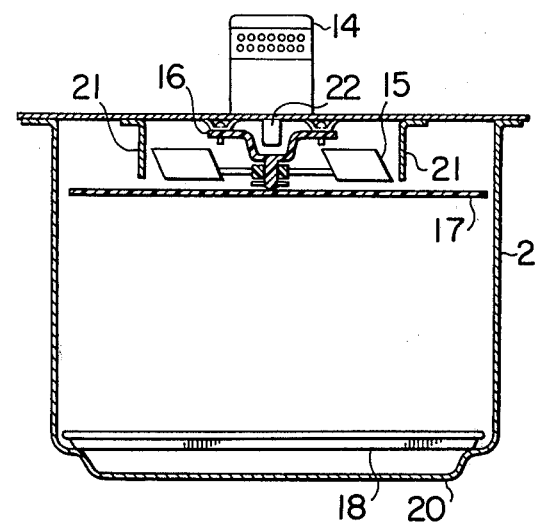
FIG. 3 shows a cross sectional view of the microwave oven of FIG. 1.

Referring to FIG. 3, the reference numeral 2 designates the heating cavity constructed by welding thin stainless plates. It is designed to have a substantially parallelepiped structure when a door (not shown) for permitting the insertion and removal of the food is closed. The numeral 20 designates a sunken section provided at the bottom of the heating cavity 2 for rendering the effective volume of the microwave oven larger and which is used as a reservoir for liquid from the food, 18 designates a food platform made of glass which is mounted at the bottom of the heating cavity 2, and 14 designates the magnetron which serves as a high frequency exciting means, mounted at the top of the heating cavity 2. The magnetron is mounted in a small borehole formed at the center of the top surface of the heating cavity such that an antenna thereof hangs vertically. The numeral 21 designates flat plates of conductive material such as stainless steel, welded to the top surface of the heating cavity. They are mounted to the left and to the right of the antenna 22, respectively, parallel to each other with a spacing of 9 to 10 cm from the antenna 22.

Figure 4:
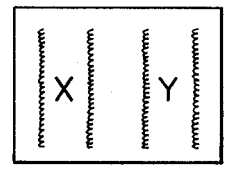
FIG. 4 shows a plan view of a heating pattern obtained when heating was conducted in a prior art microwave oven.
Figure 5:
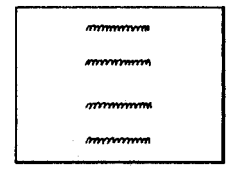
FIG. 5 shows a plan view of a heating pattern obtained when heating was conducted in the present microwave oven.

The heating operation is explained below. It is assumed that the dimensions of the parallelepiped heating cavity 2 are 33.5 cm in width, 26 cm in depth and 26.5 cm in height. First, a paper impregnated with an aqueous solution of cobalt chloride is placed on the food platform 18 and heated in the microwave oven. When heating was conducted without the metal plates 21, a pattern as shown in FIG. 4 appeared. The darkened areas shows the areas that have been heated and changed in color. When a big cake such as that explained previously in connection with the prior art technology was cooked, the center area remained raw. Even when the stirrer vane was operated to stir the electric field the center raw area did not disappear so long as the location of the magnetron was maintained symmetrically, both depthwise and lengthwise. When the metal plates 21 were mounted according to the present embodiment, the pattern of the cobalt chloride appeared as shown in FIG. 5, which showed that the center area was well heated. Thus, when a big cake is cooked in this microwave oven, all portions including the center portion of the cake except a portion of the outer area is well heated. Of course, it is possible to make a cake free of a raw portion when the stirrer vane of appropriate design is rotated.

The positions at which the metal plates 21 are mounted correspond to the intermediate positions of the darkened areas in the pattern shown in FIG. 4 (for example the positions X and Y). When the positions of the metal plates are shifted therefrom, the pattern shown in FIG. 5 disappears and the pattern of FIG. 4 appears. Since the antenna 22 of the magnetron 14 hangs vertically, it excites a vertical electric field. According to the teaching of electromagnetics, it can be said from the above that a major mode excited within the heating cavity without the plates 21 has vertical electric field components at the positions spaced 9 to 10 cm to the left and to the right from the antenna 22 to establish the pattern shown in FIG. 4, from which it is difficult to heat the center area of a big cake. However, by arranging the flat plates 21, the above mode disappears and instead a mode which creates the pattern shown in FIG. 5, in which no vertical electric field component exist at the positions spaced 9 to 10 cm to the left or to the right from the antenna 22, is established as a major mode, which allows the center area of the big cake to be well heated. Accordingly, as means for exciting a high frequency wave within the heating cavity 2, not only the magnetron antenna hanging vertically but any means which enables the excitation of a vertical electric field, such as a rectangular wave guide excited under the $TE_{1,0}$ mode with its H plane coupled through a small aperture, may be employed. While the metal plates 21 in the present embodiment are shaped as shown in FIG. 6, apertures may be formed therein, as shown in FIG. 8, to allow even larger stirrer vanes to rotate smoothly in their vicinity. It should be also understood that the metal plates 21 need not be mounted completely vertically but may be inclined to a certain extent to accomplish the same object. Each of the metal plates 21 may be divided into two sections, or may be bent longitudinally with an obtuse angle therebetween as shown in FIG. 7.

Furthermore, for those heating cavities having dimensions other than those of the above embodiment, if the electric field at the center for the major mode is weak, it is possible to cause the mode to disappear by arranging the conductors at the positions of strong electric field under that mode, in parallel with the electric field.

As described hereinabove, the present invention can provide a microwave oven which has an electric field distribution that is strong at the center thereof and symmetrical both depthwise and lengthwise and which is simple in structure. Thus it enables the cooking of a big cake, which hitherto has been difficult to accomplish, and enhances the performance of uniform heating.

As stated above, when the microwave feeder section is positioned at the symmetrical position, both depthwise and lengthwise, in the heating cavity and no electric field disturbing member such as the stirrer vane is provided and the heating cavity is of parallelepiped structure, the electric field distribution in the heating cavity is symmetrical, both depthwise and lengthwise. In order to prevent disturbance of the symmetrical electric field distribution, both depthwise and lengthwise, a bearing of the stirrer should be coaxial with the microwave feeder section. It is most preferable that the center portion 23 of the stirrer vane be constructed of material of low dielectric loss as shown in FIG. 9 and the outer periphery of the stirrer vane be provided with a plurality of vane sets 15a, 15b each of which includes oppositely inclined vanes made of metal or a material coated with a metal. The reasons for the above requirement is given below:

a. When both the center 23 of the stirrer and the vane 15 are made of metal, the electromagnetic wave radiated from the microwave feeder section which is immediately above the stirrer shaft, goes around the periphery of the stirrer vane and then enters the heating cavity. As a result, for a flat article to be heated such as a cake, the center area thereof is little heated. This is because a number of modes are established from the bottom of the stirrer vane to the heating cavity and this trend becomes more and more remarkable as the size of the vanes becomes larger in order to render the disturbance of the electromagnetic wave as large as possible.

When the center area is constructed by material of low dielectric loss such as POLYSULFON (registered trade mark) according to the present invention, the electric field intensity at the center area and at the periphery may be adjusted by changing the distance l of the vanes and the size of the vanes may be selected to be any large size so that the vanes with enhanced stirring effect can be attached to provide fine, uniform distribution of the electric field.

b. When vanes having their center portions made of metal are positioned near the microwave feeder section the uniform heating of the article is apt to be lost by nonuniformity in the distances from the microwave feeder section to the vanes and in the depthwise and lengthwise dimensions. Accordingly, the further the metallic reflector is located from the microwave feeder section the greater is the influence exerted by the uniformity in the dimensions.

c. Since the stirrer vanes 15a and 15b are inclined oppositely by the angle $\theta$, the amount of the electromagnetic wave radiated is constant in every direction during one rotation of the stirrer vane assembly. Thus a symmetrical distribution, both depthwise and lengthwise, is obtained. A method for maintaining the electric field distribution in the heating cavity symmetrical both depthwise and lengthwise is now explained.

As shown in FIG. 2 a conventional microwave oven includes a partition 17 for separating the article container from the stirrer vane container. In the past, the partition has been usually constructed by welding a metal plate to the heating cavity and bolting the partition to the metal plate. In such a construction, however, the symmetrical electric field distribution, both depthwise and lengthwise, is disturbed. In the present invention, as shown in FIG. 2, the partition mount 24 made of a low dielectric loss material such as POLY-SULFON (registered trade mark), is bolted at the top of the heating cavity and the partition is fixed to the partition mount by canoe clips 25.

The intermediate portion of the partition is structured such that the stirrer shaft 16 comes closer to the partition 17 than to the rotation plane of the stirrer vane. In this manner, possible deformation of the vane during cleaning is avoided.

Further, in order to assure that the tray is located at the center, both depthwise and lengthwise, a raised portion 26 is provided on a rear wall of the heating cavity so that when the tray is placed in a natural way it is forced to the center of the heating cavity.

What is claimed is:

1. A microwave oven comprising a main oven body, a heating cavity of substantially parallelepiped structure having top and rear walls, a door releasably closing an opening of said heating cavity, and a high frequency feeder section for supplying microwave energy into said heating cavity, wherein the improvement comprises:

means for mounting said high frequency feeder section on the top wall of said heating cavity, said feeder section being positioned substantially symmetrically, both depthwise and lengthwise, with respect to said heating cavity for producing a main mode excitation having a plurality of strong vertical electric-field components distributed parallel to the depth of said heating cavity, and a pair of parallel conductor plates mounted on the top wall of said heating cavity on both sides of said high frequency feeder section, said pair of conductor plates protruding substantially vertically inside said heating cavity and being aligned respectively with a pair of strong electric-field components distributed on both sides of said high frequency feeder, whereby said main mode of excitation is changed to another having strong vertical electric-field components parallel to the width of said cavity thereby providing sufficient heat at the center portion of an article placed within said heating cavity.

2. A microwave oven according to claim 1, further comprising electromagnetic wave stirring means mounted below and substantially coaxially with said high frequency feeder section to further modify the electric-field distribution caused by said pair of conductor plates to produce a uniform electric-field distribution.

3. A microwave oven according to claim 1, further comprising a tray located at the bottom of said heating cavity for supporting an article to be heated, and a projection provided on the rear wall of said heating cavity to enable alignment of said tray at the center of the bottom of said heating cavity by inserting said tray so that a side thereof faces the rear wall and is in contact with said projection.

4. A microwave oven according to claim 1, wherein electromagnetic wave stirring means is further provided below and substantially coaxially with said high frequency feeder section, and wherein a center portion of said electromagnetic wave stirring means is made of a low dielectric loss material and a peripheral portion thereof is made of a conductor to form a stirrer.

5. A microwave oven according to claim 4, wherein said stirrer includes a plurality of pairs of vanes, each of said pair of vanes having oppositely inclined conductors.

6. A microwave oven comprising a main oven body, a heating cavity of substantial parallelepiped structure having a top wall, a door for releasably closing an opening of said heating cavity, a microwave oscillator for radiating microwave energy into said heating cavity, and an electromagnetic wave stirring means having a shaft and stirrer vanes, said microwave oscillator being positioned approximately at the center of the top wall of said heating cavity, said heating cavity including a partition plate which is transparent to electromagnetic energy for separating from said microwave oscillator a container in which an article to be heated is placed, said partition plate being fixed to the top wall of said heating cavity by means of a partition mount made of low dielectric loss material, said stirring means being rotatably mounted coaxially with said microwave oscillator and adapted to be driven by the cooling air flow for said microwave oscillator, a tip end of the shaft of said stirring means protruding downwardly beyond the rotation plane of the stirrer vanes of said stirring means thereby preventing said stirrer vanes from coming into contact with said partition plate.

* * * * *